H. S. BLACKMORE.
PROCESS FOR PRODUCING METALS.
APPLICATION FILED SEPT. 24, 1907.

918,269.

Patented Apr. 13, 1909.

UNITED STATES PATENT OFFICE.

HENRY SPENCER BLACKMORE, OF MOUNT VERNON, NEW YORK.

PROCESS FOR PRODUCING METALS.

No. 918,269.  Specification of Letters Patent.  Patented April 13, 1909.

Original application filed September 23, 1904, Serial No. 225,642. Divided and this application filed September 24, 1907. Serial No. 394,369.

*To all whom it may concern:*

Be it known that I, HENRY SPENCER BLACKMORE, a citizen of the United States, residing at Mount Vernon, in the county of Westchester and State of New York, have invented certain new and useful Improvements in Processes for Producing Metals, of which the following is a specification.

This invention relates to the reduction of metals, and is a division of an application filed by me September 23, 1904, Serial No. 225,642, being a species thereof, which application is a division of my original application filed April 18, 1903, Serial No. 153,329, and of which original application the present application is also a division; and said invention includes the subject-matter revealed and claimed in Letters-Patent of the United States granted to me October 22, 1901, and numbered 685,198, and May 6, 1902, numbered 699,282, augmented by the action of an electric current.

My invention therefore consists in the reduction of metals by the action of carbids, acetylids, or other metal-carbon-containing compounds on metal-containing substances, augmented by the action of an electric current or more specifically by a direct or electrolytic current, which, when exercised during electrolysis, in conjunction with the natural affinity of the electro-negative constituents or anion of the compound or compounds of the electrolyte for metal of the carbid, acetylid, or other metal-carbon-containing compound, comprising, or contained in, the electrolytic electrode, results in a great saving with reference to time, wear and tear of apparatus, and facility in reduction, which reduction may be termed an electro-thermo-chemical process.

In carrying out my invention I prefer to use the apparatus illustrated in the accompanying drawing, in which—

Figure 1:
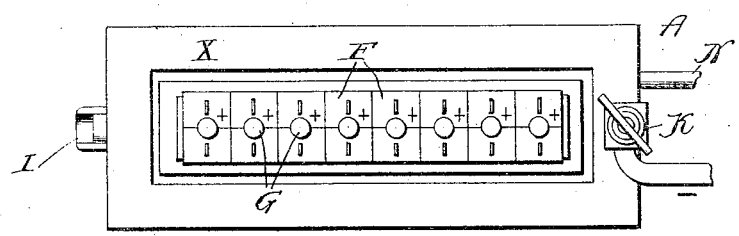
Figure 2:
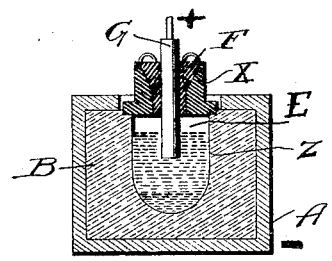
Figure 3:
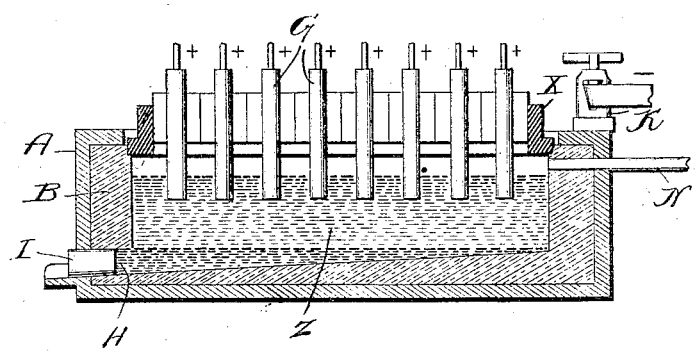

Figure 1 is a top plan view; Fig. 2, a transverse vertical section, and Fig. 3 longitudinal vertical section.

Referring to the several views, the letter A indicates a box or receptacle, preferably of cast iron, lined with a conductive substance B, such as carbon.

The material to be reduced is introduced into the apparatus through the openings E, which are closed by the insulating covers or plugs F entering the opening in the cover X, through which opening passes the electrode G, comprising or containing a carbid, acetylid, or other metal-carbon-containing compound, said electrode being adapted to be employed as an anode during the process of electro-chemical reduction.

In the operation of the process, I place in the receptacle a quantity of aluminium oxid and aluminium fluorid and fuse the same by passing a current of electricity therethrough, between the carbon lining B, of the receptacle A, and the electrode G, having first started an electric arc between the same by placing them in contact and gradually separating them, and feed the aluminium oxid and aluminium fluorid in at intervals as it fuses, and continue to add the mixture until the interior of the apparatus has been sufficiently filled; I then add to the molten content a small quantity of calcium chlorid to assist the fluidity of the mixture, and on continuing the current a reducing action is set up between the carbid contained in the electrode G, such as calcium carbid, and the electro-negative constituents, fluorin and oxygen of the aluminium fluorid and oxid supplied thereto, whereby they are removed, the fluorin combining with the calcium of the calcium carbid and the carbon liberated with the oxygen thereof, at the same time separating the metallic aluminium which accumulates in the bottom of the apparatus and is withdrawn from time to time through the tap-hole H, by removing the tap-hole plug I. The carbon oxid evolved during the reduction of the carbon of the anode G with the oxygen of the substance reduced, escapes as gas through the conduit N.

By supplying new anodes G and fresh aluminium oxid and fluorid, from time to time, withdrawing the metal reduced and the accumulating fluorids, the process may be carried on continuously, so long as the materials are maintained in a molten condition.

The term "carbid", as employed throughout this specification and claims, has particular reference to unions of metal with carbon of any atomicity, be it normal carbid, acetylid, or other metal-carbon-containing compound, so long as the metal-carbon-containing compound exists in a form capable of being utilized in accordance with the process herein set forth.

I may substitute any other practical carbid or metal-carbon-containing compound for the calcium carbid, without departing from the spirit of my invention, which also consists in employing a metal carbid, or metal-carbon-containing compound as electrode in the electrochemical reduction of metal from its compound or compounds, the electrolyte, containing the said metal compound, having an electro-negative constituent or anion which will combine with metal of the metal-carbon-containing compound. The electrode may consist of calcium or other carbid, or other metal-carbon-containing compound with carbon or other binder, or it may consist wholly of the carbid, the essential feature being that the electrode contains a carbid or metal-carbon-containing compound of some form, but no claim is however made herein to electrodes comprising or containing metal carbids, acetylids, or other metal-carbon-containing compounds with a carbon or other binder, specifically, such composite electrodes being claimed in my application filed August 31, 1907, Serial No. 390,949, which application is also a division of Serial No. 153,329, filed April 18, 1903.

Instead of metal oxy-fluorid, or its equivalent, I may employ any other oxy-haloid, or any substance containing metal and two or more electro-negative elements, or a metal oxid per se, so long as the electro-negative elements or anion will combine with the metal of the carbid, or other metal-carbon-containing compound, comprising, or contained in, the electrode or electrodes employed.

The term "compound" used throughout this specification and claims is employed strictly in a chemical sense, and implies distinct chemical compounds, binary or otherwise, containing chemically combined elements, of which metal and carbon are essentials.

The term "metal-carbon-containing compound" employed herein is intended to imply and does imply a distinct chemical compound containing chemically combined elements, of which metal and carbon are essentials, and said expression is to be interpreted to the full extent and with the full meaning of the terms relating to such compounds as broadly set forth in the specification of the original application, filed April 18, 1903, Serial No. 153,329, of which the present application is a division as before stated, as being "substances containing metal and carbon, either as carbid, acetylid, or other union," it being obvious that the said metal-carbon-containing compound employed as electrode must be a conductor of electricity, capable of being acted upon by the anion of the electrolyte, and physically permanent or stable in character, i. e., not thermally dissociated at the temperature required for electrolysis when employed as electrolytic electrode.

Having thus fully described my invention, what I claim as new and desire to secure by Letters-Patent, is—

1. The process of producing metal, which consists in exposing a substance, containing a metal and oxygen, capable of reacting with a carbid to yield metal, to electrolysis, while employing an anode containing calcium carbid.

2. The process of producing metal, which consists in exposing a compound, containing metal and one or more electro-negative elements, capable of reacting with a carbid to yield metal, to the combined action of an electrode of calcium carbid and an electric current.

3. The process of producing metal, which consists in exposing a substance, containing a metal and oxygen, capable of reacting with a carbid to yield metal, to electrolysis, while employing an electrode containing calcium carbid.

4. The process of producing metals, which consists in electrolyzing a molten bath with an anode consisting essentially of a metallic carbid, said bath comprising a metallic oxid and a metallic salt whose anion will combine with the metal of said carbid.

5. The process of producing metal, which consists in electrolyzing a molten bath with an anode comprising a metal carbid, said bath containing a metal oxid and a metal salt, the anion of which will combine with metal of said carbid.

6. The process of producing metal, which consists in electrolyzing a molten bath with an anode comprising a metal carbid, said bath containing a compound of metal with oxygen and fluorin, the fluorin of which will combine with metal of said carbid.

7. The process of producing metal, which consists in electrolyzing a molten bath with an anode comprising a metal carbid and a binder, said bath containing a metal oxid and a metal salt, the anion of which will combine with the metal of said carbid.

8. The process of producing metal, which consists in electrolyzing a molten bath with an anode comprising a metal carbid and a binder, said bath containing a compound of metal with oxygen and fluorin, the fluorin of which will combine with metal of said carbid.

9. The process of producing metal, which consists in electrolyzing a molten bath with an anode comprising a metal carbid and a carbon binder, said bath containing a metal oxid and a metal salt, the anion of which will combine with the metal of said carbid.

10. The process of producing metal, which consists in electrolyzing a molten bath with an anode comprising a metal carbid and a carbon binder, said bath containing a compound of metal with oxygen and fluorin, the fluorin of which will combine with metal of said carbid.

11. The process of producing metal, which consists in electrolyzing a molten bath with an anode comprising a metal-carbon-containing compound, said bath containing a metal oxid and a metal salt, the anion of which will combine with metal of said metal-carbon-containing compound.

12. The process of producing metal, which consists in electrolyzing a molten bath with an anode comprising a metal-carbon-containing compound, said bath containing a compound of metal with oxygen and fluorin, the fluorin of which will combine with metal of said carbon-containing-compound.

13. The process of producing metal, which consists in electrolyzing a molten bath with an anode comprising a metal-carbon-containing compound and a binder, said bath containing a metal oxid and a metal salt, the anion of which will combine with metal of the metal-carbon-containing compound.

14. The process of producing metal, which consists in electrolyzing a molten bath with an anode comprising a metal-carbon-containing compound and a binder, said bath containing a compound of metal with oxygen and fluorin, the fluorin of which will combine with metal of said metal-carbon-containing compound.

15. The process of producing metal, which consists in electrolyzing a molten bath with an anode comprising a metal-carbon-containing compound and a carbon binder, said bath containing a metal oxid and a metal salt, the anion of which will combine with the metal of said metal-carbon-containing compound.

16. The process of producing metal, which consists in electrolyzing a molten bath with an anode comprising a metal-carbon-containing compound and a carbon binder, said bath containing a compound of metal with oxygen and fluorin, the fluorin of which will combine with metal of said metal-carbon-containing compound.

In testimony whereof I affix my signature in presence of two witnesses.

HENRY SPENCER BLACKMORE.

Witnesses:
J. R. NOTTINGHAM,
B. F. BURNS.